United States Patent Office 3,226,267
Patented Dec. 28, 1965

3,226,267
HIGH STRENGTH ALUMINUM ALLOY EXTRUSION PROCESS AND PRODUCT
George S. Foerster, Midland, Mich., assignor to The Dow Chemical Company, Midland, Mich., a corporation of Delaware
No Drawing. Filed Mar. 26, 1962, Ser. No. 182,651
7 Claims. (Cl. 148—11.5)

This invention relates to the extrusion of aluminum alloys and more particularly is concerned with the use of a pelletized aluminum base alloy containing magnesium and silicon to prepare high strength pellet extrusions and the extruded product prepared thereby.

In general, the aluminum base alloy to be employed for pelleting and subsequent extruding contains on a weight basis from about 0.5 to about 10 percent, and preferably from about 1 to about 5 weight percent magnesium, from about 1 to about 15 and preferably from about 1 to about 5 weight percent silicon, balance aluminum, wherein the minimum ratio of silicon to magnesium in the alloy is maintained at 0.58.

Commercial aluminum alloys containing silicon and magnesium ordinarily employ these alloying ingredients in concentrations falling within the solubility limit of these metals in the alloy. Such aluminum base-magnesium-silicon alloys must be extruded at undesirably high working temperatures, e.g., 900° F. or higher. Further, adding these alloying ingredients in quantities greater than their solubility limit in the matrix to ingot materials has a pronounced detrimental effect on ductility of the extruded product.

Now, it has been discovered that a pelletized aluminum alloy containing silicon and magnesium in excess of the solubility limits of these elements in aluminum wherein the silicon/magnesium ratio is at least 0.58 readily can be extruded at moderate extrusion temperatures, e.g., from about 750 to about 850° F. into fabrications having unexpectedly high strength properties and suitable ductility.

The present process, therefore, provides as its principal advantage a novel way for producing high strength aluminum base-magnesium-silicon-extrusions at low, readily obtainable extrusion temperatures.

In carrying out the instant process, an alloy is prepared using foundry alloying and melt techniques as practiced in the aluminum art. A melt of the alloy is prepared and rapidly quenched as by atomizing into pellets. Conveniently the pellets can be produced by jet atomizing or wheel atomizing either in an inert atmosphere such as natural gas, nitrogen, argon, etc., for example, or in air. The atomized pellets are fabricated into high strength extrusions using normal pellet extrusion techniques and apparatus.

For use in the pellet extrusion process, ordinarily the pellets are preheated to a temperature at least that of the extruder container and the heated pellets then are loaded into the container and extruded. However, if desired, the pellets can be used in the extrusion process without preheating. Also the pellets can be precompacted prior to extrusion. By precompacting the pellets under reduced pressure, blistering and formation of internal voids substantially are avoided during any post extrusion heat treatment that may be employed.

Normally, the extruded product is quenched as it emerges from the extruder and subsequently aged. Alternatively, however, if desired, the extruded product can be solution heat treated, quenched and aged. If the product is solution heat treated, preferably the length of time for the heat treatment is minimized to avoid (1) agglomeration of any dispersed phase that might be present in the alloy, (2) recovery, (3) recrystallization and (4) loss of strength.

The following examples will serve to illustrate further the utility of the present invention but is not meant to limit it thereto.

*Example 1*

A number of aluminum base-magnesium-silicon alloys were prepared. Each alloy was atomized into pellet form. About 85% of the pellets ranged from —20+200 mesh U.S. standard sieve; the remainder passed through the 200 mesh sieve.

Separate batches of the atomized alloy pellets were preheated to about 700° F. and placed in the pellet container of a ram extruder which container also was about this same temperature.

The pellets were extruded at an extrusion temperature of about 800° F. and an extrusion rate of about 5 feet per minute into a strip 0.2 inch thick by 1 inch wide and water quenched at the die. The resulting strip was artificially aged at 320° F. for 16 hours without prior solution heat treatment.

As a control, similar batches of the alloy were cast into 3 inch diameter ingots, cut into billets, extruded into the same size strip at 800° F. and 5 feet per minute extrusion rate and similarly aged.

Standard test bars were prepared and the percent elongation, tensile yield strength and tensile strength of the pellet and ingot extrusions were determined at room temperature. The results of these tests are presented in Table I which follows.

TABLE I

| Run No. | Nominal Composition | Ext. Form | Si/Mg Ratio | Results | | |
|---|---|---|---|---|---|---|
| | | | | Percent E | TYS 1,000 | TS, p.s.i. |
| 1 | Al—1.5 Mg—12 Si | Pellet | 8.00 | 6 | 44 | 56 |
| 2 | Al—1.5 Mg—12 Si | Ingot | 8.00 | 4 | 39 | 46 |
| 3 | Al—8.2 Mg—4.8 Si | Pellet | .58⁵ | 2 | 45 | 53 |
| 4 | Al—8.2 Mg—4.8 Si | Ingot | .58⁵ | 3 | 25 | 31 |
| 5 | Al—5.5 Mg—14 Si | Pellet | 2.54 | 1 | 52 | 61 |
| 6 | Al—5.5 Mg—14 Si | Ingot | 2.54 | 0.5 | 38 | 42 |

A comparison of the extrusions of the same composition prepared from pellets and ingot clearly demonstrates the unexpectedly high strength properties present in the pellet extrusions at the low extrusion temperature.

*Example 2*

A number of aluminum base-magnesium-silicon alloys were formulated and pelletized following the procedure described in Example 1.

These pellets were extruded in the same manner as described in Example 1, except an extrusion rate of 15 feet per minute was employed. The resulting strip extrusions were solution heat treated at about 970° F. for ½ hour, quenched and aged for 16 hours at 320° F.

Standard test bars were prepared from the so treated fabrications and the percent elongation, tensile yield strength and tensile strength of the bars were determined at room temperature. The results of these tests are presented in Table II which follows:

TABLE II

| Run No. | Alloy Composition | Si/Mg Ratio | Results | | | Remarks |
|---|---|---|---|---|---|---|
| | | | Percent E | TYS 1,000 | TS, p.s.i. | |
| 1 | Al—9.7 Mg—5.4 Si | 0.55 | 7 | 30 | | Si/Mg ratio outside operative range. |
| 2 | Al—0.9 Mg—.92 Si | 1.02 | 13 | 36 | 40 | |
| 3 | Al—0.9 Mg—10 Si | 11.1 | 6 | 46 | | |

These tests show the effect of Si/Mg ratio on the strength of the extruded product.

Various modifications can be made in the present invention without departing from the spirit or scope thereof for it is understood that I limit myself only as defined in the appended claims.

I claim:

1. A process for preparing high strength aluminum alloy extrusions which comprises: (1) providing an aluminum alloy consisting essentially of from about 0.5 to about 10 weight percent magnesium and from about 1 to about 15 weight percent silicon, balance aluminum, the weight ratio of silicon to magnesium in said alloy being at least 0.58, (2) extruding the aluminum alloy thereby to produce a high strength aluminum extrusion.

2. A process for preparing high strength aluminum alloy pellet extrusions which comprises: (1) providing in pellet form an aluminum alloy consisting essentially of from about 0.5 to about 10 weight percent magnesium and from about 1 to about 15 weight percent silicon, balance aluminum, the weight ratio of silicon to magnesium in said alloy being at least 0.58; (2) extruding the pelletized aluminum alloy from a pellet extruder thereby to produce a high strength aluminum extrusion.

3. The process as described in claim 2 wherein the extrusion temperature is from about 750° F. to about 850° F.

4. The process as described in claim 2 and including the step of quenching the extrusion as it emerges from the extruder and subsequently aging said extrusion.

5. The process as defined in claim 1 and including the steps of subsequently solution heat treating, quenching and aging the extruded product.

6. A high strength aluminum alloy pellet extrusion prepared according to the process comprising: (1) providing in pellet form an aluminum alloy consisting essentially of from about 0.5 to about 10 weight percent magnesium, from about 1 to about 15 weight percent silicon, balance aluminum, the weight ratio of silicon to magnesium in said alloy being at least 0.58; (2) extruding the pelletized aluminum alloy from a pellet extruder thereby to produce a high strength aluminum base extrusion.

7. A high strength aluminum alloy pellet extrusion prepared according to the process comprising: (1) providing in pellet form an aluminum alloy consisting essentially of from 1 to about 5 weight percent magnesium, from about 1 to about 5 weight percent silicon, balance aluminum, the weight ratio of silicon to magnesium in said alloy being at least 0.58; (2) extruding the pelletized aluminum alloy at a temperature of from about 750° F. to about 850° F. from a pellet extruder thereby to produce a high strength aluminum alloy extrusion.

References Cited by the Examiner

UNITED STATES PATENTS

| 1,908,023 | 5/1933 | Kempf | 75—148 |
| 2,155,129 | 4/1939 | Hall et al. | 75—148 |
| 2,966,731 | 1/1961 | Towner et al. | 75—138 |
| 3,031,299 | 4/1962 | Criner | 75/147 |

FOREIGN PATENTS

| 384,889 | 12/1932 | Great Britain. |
| 394,746 | 7/1933 | Great Britain. |

DAVID L. RECK, *Primary Examiner.*

RAY K. WINDHAM, *Examiner.*